United States Patent [19]

Sheu

[11] Patent Number: 5,170,966
[45] Date of Patent: Dec. 15, 1992

US005170966A

[54] SAFETY DEVICE FOR AN EMERGENCY LANDING OF AN AIRCRAFT

[76] Inventor: Por-Jiy Sheu, 11F-7, No. 3, Fu-Shin Erh Rd., Kaohsiung City, Taiwan

[21] Appl. No.: 866,574

[22] Filed: Apr. 10, 1992

[51] Int. Cl.⁵ .............................................. B64F 1/00
[52] U.S. Cl. ............................ 244/110 E; 244/110 R; 244/114 R
[58] Field of Search ............ 244/110 E, 110 R, 114 R

[56] References Cited

U.S. PATENT DOCUMENTS

| | | | |
|---|---|---|---|
| 2,425,886 | 8/1947 | Knox | 244/110 E |
| 3,210,029 | 10/1965 | Brusch et al. | 244/114 R |
| 3,380,690 | 4/1968 | Rego | 244/114 R |
| 3,490,722 | 1/1970 | Schnarr et al. | 244/110 E |

*Primary Examiner*—Joseph F. Peters, Jr.
*Assistant Examiner*—Anne E. Bidwell
*Attorney, Agent, or Firm*—Cushman, Darby & Cushman

[57] ABSTRACT

A safety device for an emergency landing of an aircraft has a runaway. A unit for retarding the speed of the aircraft is mounted in the runway and includes a plurality of rows of juxtaposed rotary bearing members, each of which is provided with a friction surface, a plurality of rotatable shafts, each of which carries each row of the rotary bearing members, and a hydraulic unit provided in each row of the rotary bearing members. A unit for braking the speed of the aircraft is fixed in the runway downstream of the retarding unit and includes a plurality of rows of juxtaposed stationary bearing members, each of which is provided with a friction surface. A unit for supporting and guiding the aircraft to move on the runway includes a base slidable on the retarding unit and the braking unit and a preventing unit for preventing the aircraft from being released from the base after the aircraft lands on the base. The safety device further includes a fire-retarding fluid provided in the runway.

11 Claims, 4 Drawing Sheets

SAFETY DEVICE FOR AN EMERGENCY LANDING OF AN AIRCRAFT

BACKGROUND OF THE INVENTION

1. Field of the Invention

This invention relates to a safety device for an aircraft, more particularly to a safety device for an emergency landing of an aircraft.

2. Description of Related Art

It is well known that once an aircraft is out of control, a terrible air disaster will occur. For assuring the safety of passengers, pilots, cabin attendants and the aircraft, a safety system is required.

The applicant of this application filed a U.S. application Ser. No. 012,829 on Feb. 10, 1987 which discloses a safety system for a malfunctioning aircraft and which corresponds to R.O.C. application No. 80214109. The safety system is used for progressively retarding the movement of a malfunctioning aircraft so that the aircraft can land safely on the ground. The one drawback is that the safety system is not provided with a means for supporting and guiding the aircraft to move properly on the emergency runway of the safety device after the aircraft lands on the emergency runway. Thus, the aircraft may run off of the emergency runway.

SUMMARY OF THE INVENTION

Therefore, the objective of this invention is to provide an improved safety device for an emergency landing of an aircraft. The improved safety device is provided with a means for supporting and guiding the aircraft to move properly on the emergency runway of the improved safety device after the aircraft lands on the emergency runway.

Accordingly, a safety device of this invention for an emergency landing of an aircraft has an emergency runway. A retarding means for retarding the speed of the aircraft is mounted in the emergency runway. The retarding means includes a plurality of rows of juxtaposed rotary bearing members, each of which is provided with a friction surface, a plurality of rotatable shafts, each of which carries each row of the rotary bearing members, and a hydraulic means provided in each row of the rotary bearing members in order to retard the rotation of the rotary bearing members so as to reduce the speed of the aircraft.

A means for braking the speed of the aircraft is fixed in the emergency runway downstream of the retarding means. The braking means includes a plurality of rows of juxtaposed stationary bearing members, each of which is provided with a friction surface.

A means for supporting and guiding the aircraft to move on the emergency runway includes a base slidable on the retarding means and the braking means and means for preventing the aircraft from being released from the base after the aircraft lands on the base. The safety device further includes a fire-retarding fluid provided in the emergency runway.

BRIEF DESCRIPTION OF THE DRAWING

Other features and advantages of the present invention will become apparent in the following detailed description of the preferred embodiments, with reference to the accompanying drawings, of which.

DETAILED DESCRIPTION OF THE INVENTION

Figure 1:
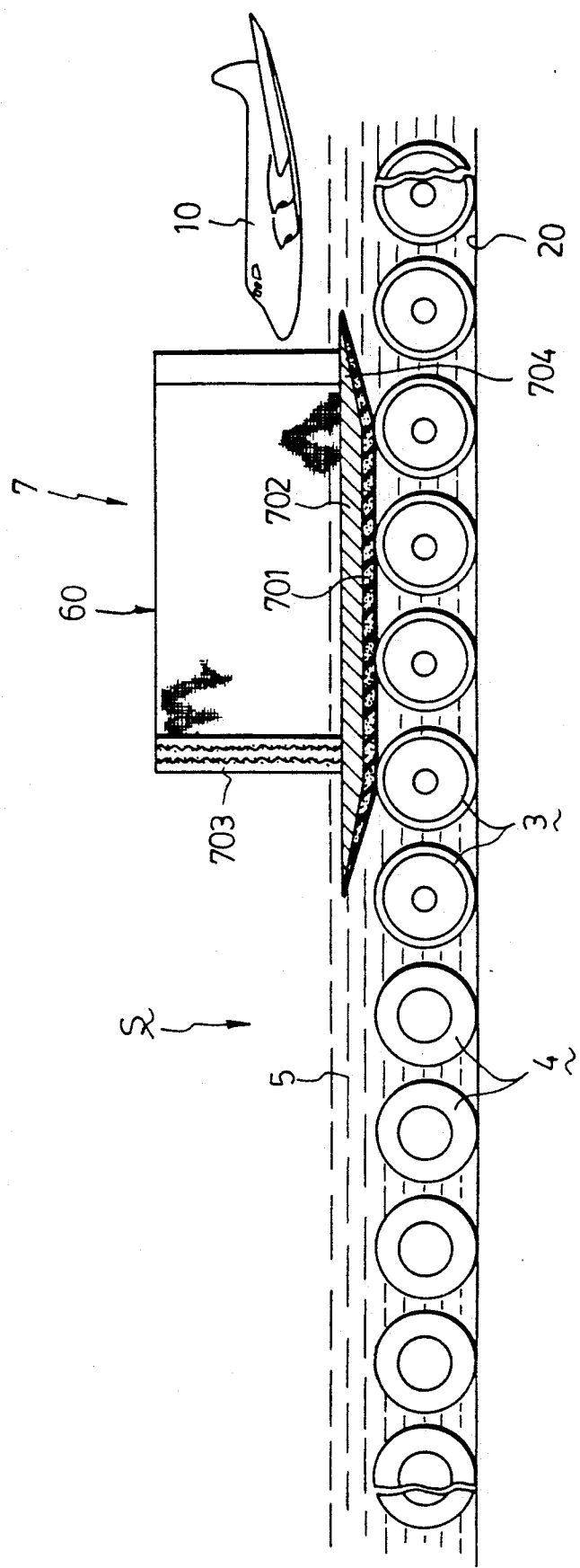
FIG. 1 is a side view of a safety device of this invention for an emergency landing of an aircraft.
Figure 2:
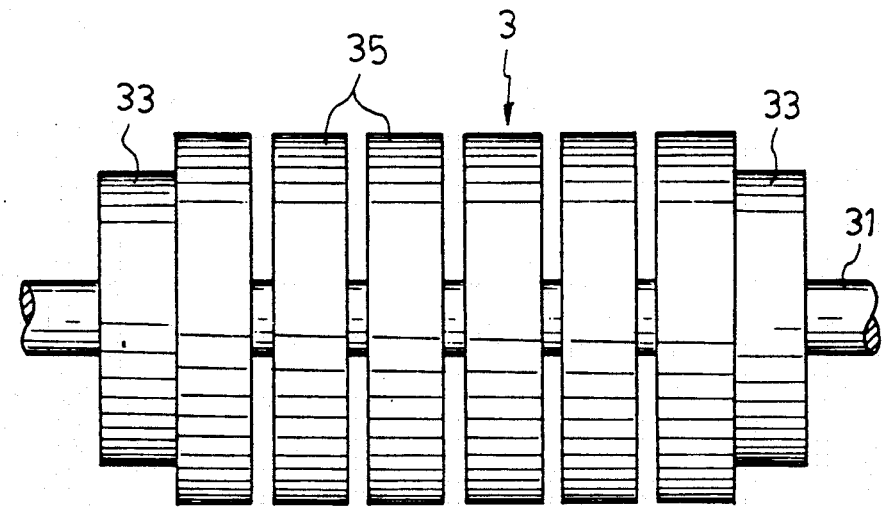
FIG. 2 is a schematic view of a means for retarding the speed of the aircraft.
Figure 3:
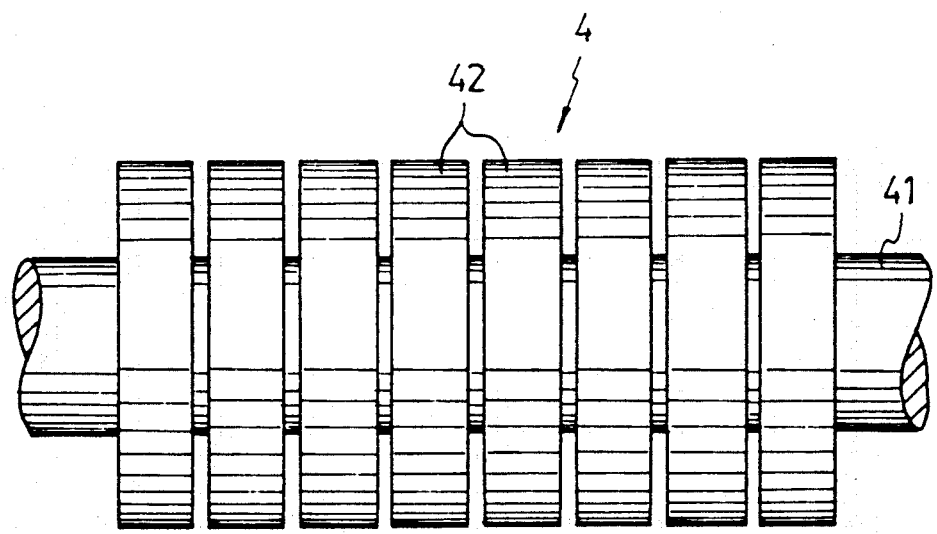
FIG. 3 is a schematic view of a means for braking the speed of the aircraft.
Figure 4:
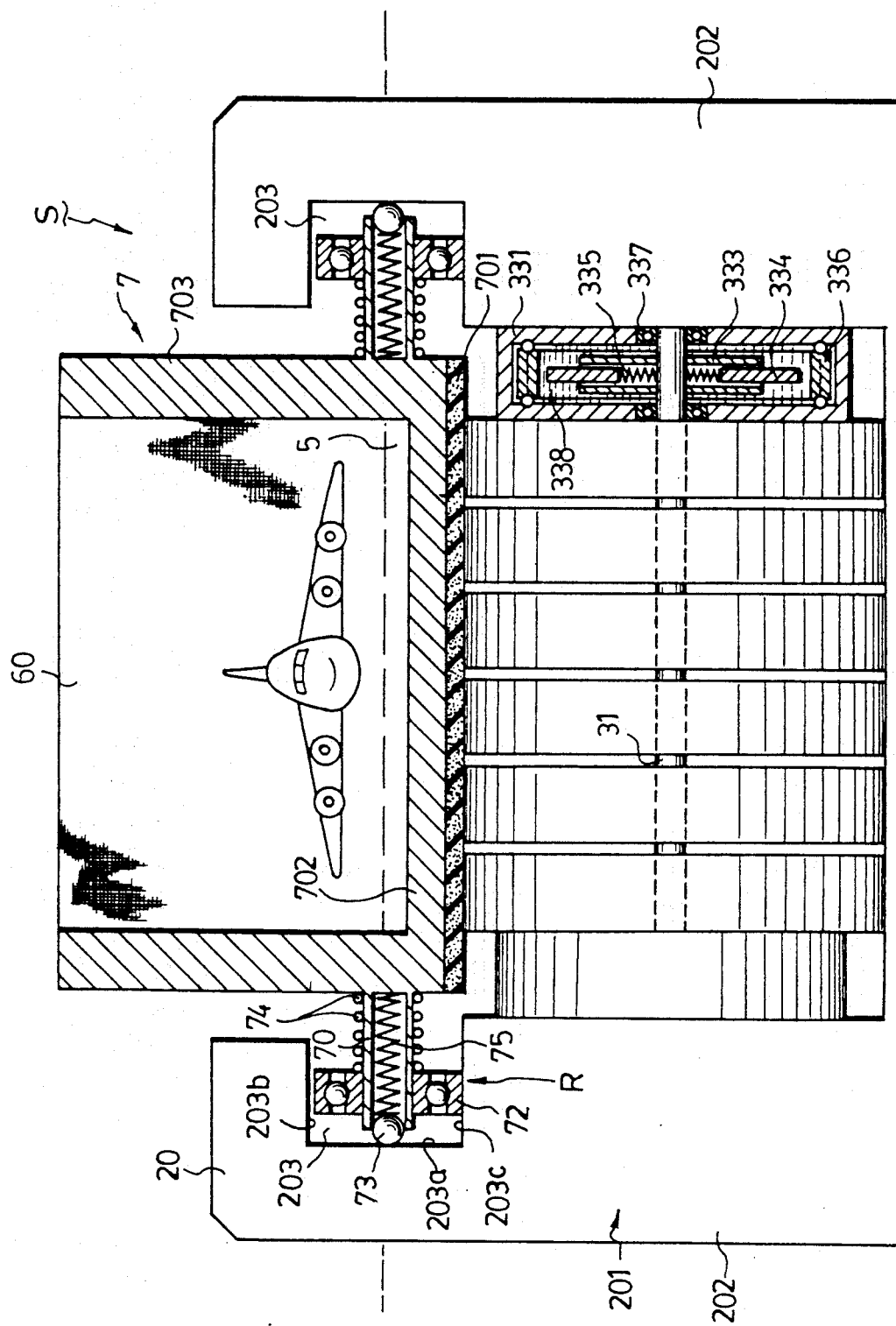
FIG. 4 is a front view of the safety device of this invention.
Figure 5:
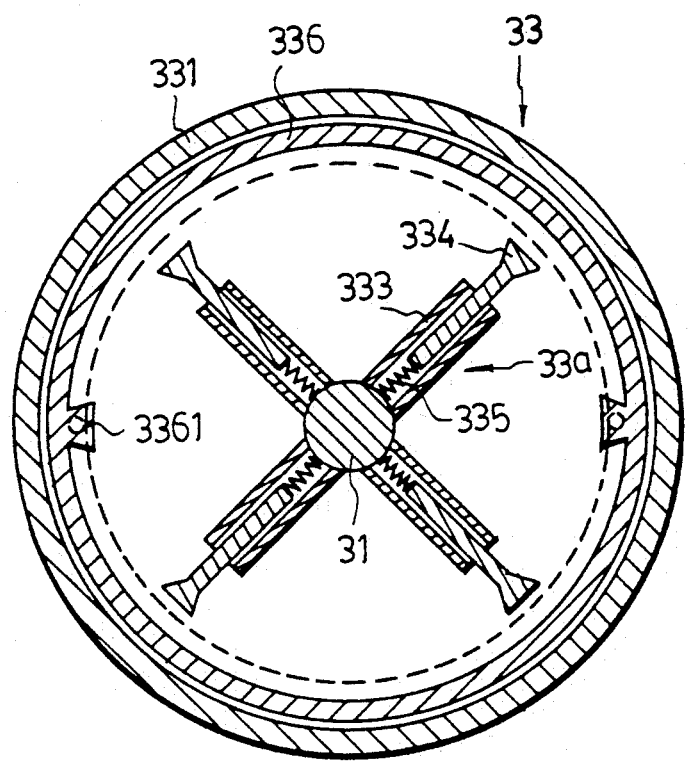
FIG. 5 is a sectional view of a hydraulic means of the retarding means of this invention.

Referring to FIGS. 1 to 5, a safety device (S) of this invention for an emergency landing of an aircraft (10) includes an emergency runway (20) which is provided in an indentation of the ground. The emergency runway (20) includes a wall means (201) extending along the length of the emergency runway (20). The wall means (201) includes a pair of opposite elongated walls (202) having two opposite guide ways (203) and defines a space between the elongated walls (202).

A retarding means (3) for retarding the speed of the aircraft (10) is mounted in the space of the wall means (201) of the emergency runway (20). The retarding means (3) includes a plurality of rows of juxtaposed rotary bearing members (35), each of which is provided with a friction surface, a plurality of rotatable shafts (31), each of which carries and simultaneously rotates with each row of the rotary bearing members (35), and a pair of hydraulic means (33) provided on two ends of the rotatable shaft (31) in each row of the rotary bearing members (35) in order to retard the rotation of the rotary bearing members (35) so as to reduce the speed of the aircraft (10). Each of the hydraulic means (33) includes a stationary sealed hollow body (331) fixed to one of the elongated walls (202) and mounted around the rotatable shaft (31) by a pair of ball bearings (337) and four angularly spaced radial vane units (33a) provided in the hollow body (331) and fixed on the rotatable shaft (31). Each of the vane units (33a) includes a radial tubular member (333) fixed on the rotatable shaft (31), a tension spring (335) provided in the tubular member (333) and having a first end fixed to the rotatable shaft (31) and a second end, and an extensible vane portion (334) connected to the second end of the tension spring (335). A rotatable ringed member (336) is mounted in the hollow body (331) and has spaced protrusions (3361) projecting inwardly. The hollow body (331) is filled with a retarding liquid (338) of high viscosity. In addition, the rotary bearing members (35) can be rubbery wheels.

A braking means (4) for braking the speed of the aircraft (10) is fixed in the space of the wall means (201) of the emergency runway (20) from downstream of the retarding means (3). The braking means (4) includes a plurality of rows of juxtaposed stationary bearing members (42) each of which is provided with a friction surface. The braking means (4) further includes a plurality of stationary shafts (41), each of which carries each row of the stationary bearing members (42) and each of which has two ends fixed to the elongated walls (202) of the emergency runway (20). The stationary bearing members (42) can be rubbery wheels.

The retarding means (3) is provided from a frontmost end of the emergency runway (20) to an intermediate portion of the emergency runway (20), and the braking means (4) is provided from the intermediate portion of the emergency runway (20) to a rearmost end of the emergency runway (20).

A supporting and guiding means (7) is used for supporting and guiding the aircraft (10) to move properly on the emergency runway (20). The supporting and guiding means (7) includes a base (702) slidable on the retarding means (3) and the braking means (4) and a preventing means for preventing the aircraft (10) from being released from the base (702) after the aircraft (10) has landed on the base (702). The base (702) has a cushion member (701) at its bottom made of an abrasion-resisting resilient material. The base (70) has a front end, a rear end (704) and two sides interconnecting the front and rear ends. The preventing means includes two pairs of spaced posts (703) fixed on the base (702), adjacent to the two sides of the base (702) respectively, and a netted housing (60) which is mounted on the posts (703) and which opens at the rear end (704) of the base (702) for access thereto in order to prevent the aircraft (10) from being released from the base (702) after the aircraft (10) lands on the base (10) through the rear end (704) of the base (702). The supporting and guiding means (7) further includes a pair of opposite retaining units (R) extending outwardly from the base (702) and being received in the guide ways (203) of the elongated walls (202) of the emergency runway (20) in order to guide the base (702) to move properly on the retarding means (3) and the braking means (4) along the length of the emergency runway (20). Each of the retaining units (R) includes a hollow shaft (70) extending outwardly from the base (702), a ball member (73) resiliently mounted to a terminating end of the shaft (70) and rotatably contacting a first wall portion (203a) of the guide way (203), a roller (72) with a bearing mounted around the shaft (70) to contact rotatably the second and third wall portions (203b, 203c) of the guide way (203), a first spring (75) mounted inside the shaft (70) and biasing the ball member (73) to abut the first wall portion (203a), and a second spring (74) mounted around the shaft (70) mounted between the roller (72) and the base (702). The first spring (75) is used as a buffer unit for reducing shock induced upon movement of the aircraft (10).

A fire-retarding fluid (5) is provided in the emergency runway (20) for extinguishing sparks produced by the aircraft (10) when the aircraft (10) lands onto the supporting and guiding means (7) and slides forward with the same. The fire-retarding fluid (5) can be a noncombustible liquid.

A malfunctioning aircraft (10) lands onto the base (702) of the supporting and guiding means (3) through the rear end (704) of the base (702). The aircraft (10) and the base (702) are guided to move forward on the retarding means (3) and the braking means (4) along the emergency runway (20) by the retaining units (R) engaged in the guide ways (203) of the elongated walls (202). The aircraft (10) is prevented from being released from the base (702) by being surrounded with the netted housing (60). The rotatable shafts (31) are rotated simultaneously with the rotary bearing members (35) while the aircraft (10) and the supporting and guiding means (7) move on the rotary bearing members (35). Since the radial vane units (33a) of the hydraulic means (33) are rotated with the rotatable shafts (31) against the retarding liquid (338), resistance to the rotation of rotatable shafts (31) and the rotary bearing members (35) is produced, thereby reducing the speed of the aircraft (10). When rotatable shafts (31) rotate to a certain speed, the extensible vane portions (334) of the radial vane units (33a) are forced centrifugally to extend radially outward and engage the protrusions (3361) of the ringed members (336). The ringed members (336) rotate along with the rotatable shafts (31) so that the resistance to the rotation of the rotatable shafts (31) and the rotary bearing members (35) is increased, thereby increasing the resistance to the movement of the aircraft (10). With the provision of the vane units (33a), the ringed members (336) and the retarding liquid (338), the faster the rotatable shafts (31) rotate, the larger the resistance thereto. Furthermore, the friction surfaces of the rotary bearing members (35) and the cushion member (701) provide additional friction force to retard the movement of the aircraft (10). As such, the speed of the aircraft (10) is reduced by the retarding means (3).

The stationary bearing members (42) of the braking means (4) provide friction for the aircraft (10). The friction coefficient of the stationary bearing members (42) is gradually increased from the stationary bearing members (42) provided at the intermediate portion of the emergency runway (20) to the stationary bearing members (42) provided at the rearmost end of the emergency runway (20). The aircraft (10) whose speed is reduced by the retarding means (3) is braked by the braking means (4). The speed of the aircraft (10) is further decreased by the stationary bearing members (42) of the braking means (4) and finally the aircraft (10) is stopped at the rearmost end of the emergency runway (20).

Accordingly, when an aircraft (10) malfunctions and needs to make an emergency landing, the aircraft (10) can land onto the supporting and guiding means (3) in order to be guided to move properly along the emergency runway (20) so as to be retarded progressively and stopped finally. Therefore, by the safety device (S) of this invention, the malfunctioning aircraft (10) can land safely onto the ground and the safety of passengers, pilots, cabin attendants, and the aircraft is assured.

While the present invention has been described in connection with what is considered the most practical and preferred embodiment, it is understood that this invention is not limited to the disclosed embodiments but is intended to cover various arrangements included within the spirit and scope of the broadest interpretations and equivalent arrangements.

I claim:

1. A safety device for an emergency landing of an aircraft comprising:

an emergency runway;

means for retarding the speed of said aircraft being mounted in said emergency runway, said retarding means including a plurality of rows of juxtaposed rotary bearing members, each of which is provided with a friction surface, a plurality of rotatable shafts, each of which carries each row of said rotary bearing members, and a hydraulic means provided in each row of said rotary bearing members in order to retard the rotation of said rotary bearing members so as to reduce the speed of said aircraft;

means for braking the speed of said aircraft mounted in said emergency runway downstream of said retarding means, said braking means including a plurality of rows of juxtaposed stationary bearing members, each of which is provided with a friction surface;

means for supporting and guiding said aircraft to move on said emergency runway including a base slidable on said retarding means and said braking means and means for preventing said aircraft from being released from said base after said aircraft landing on said base; and a fire-retarding fluid provided in said emergency runway.

2. A safety device as claimed in claim 1, wherein said emergency runway is provided in an indentation of the ground and comprises a wall means extending along the length of said emergency runway, said wall means including a pair of opposite elongated walls and defining a space between said elongated walls for receiving said retarding means, said braking means and said fire-retarding fluid.

3. A safety device as claimed in claim 2, wherein said opposite elongated walls of said wall means of said emergency runway have a pair of opposite guide ways formed therein, said supporting and guiding means further including a pair of opposite retaining units respectively extending outwardly from said base and movably received in said guide ways, whereby said supporting and guiding means is guided properly to move on said retarding means and said braking means along the length of said emergency runway.

4. A safety device as claimed in claim 3, wherein each of said retaining units includes a shaft extending outwardly from said base into one of said guide ways of said emergency runway, a roller mounted to said shaft for rolling in said one of said guide ways, and a buffer unit mounted to said shaft for reducing shock induced upon movement of said aircraft.

5. A safety device as claimed in claim 1, wherein said braking means further includes a plurality of stationary shafts, each of which carries each row of said stationary bearing members, each of said stationary shafts having two opposite ends respectively fixed to said opposite elongated walls of said wall means of said emergency runway.

6. A safety device as claimed in claim 1, wherein said base of said supporting and guiding means has a front end and a rear end, said preventing means of said supporting and guiding means including a netted housing which is mounted to said base and opens at said rear end in order to prevent said aircraft from being released from said base after said aircraft lands on said base through said rear end of said base.

7. A safety device as claimed in claim 1, wherein said rotary and stationary bearing members are rubbery wheels.

8. A safety device as claimed in claim 1, wherein said hydraulic means of said retarding means includes a stationary sealed hollow body fixed to one of said elongated walls of said wall means around each of said rotatable shafts of said retarding means, and angularly spaced radial vane units provided in said hollow body and fixed on said each of said rotatable shafts, said hollow body having a retarding liquid of high viscosity filled therein so as to provide a force resisting the rotation of said vane units as well as said rotatable shaft, whereby the rotation of said rotary bearing members can be retarded and the speed of said aircraft can be reduced.

9. A safety device as claimed in claim 8, wherein each of said radial vane units includes a radial tubular member fixed on one of said rotatable shafts, a tension spring provided in said radial tubular member and having a first end fixed to said one of said rotatable shafts and a second end, and ah extensible vane portion connected to said second end of said tension spring.

10. A safety device as claimed in claim 1, wherein said fire-retarding fluid is a noncombustible liquid.

11. A safety device as claimed in claim 1, wherein said base has a cushion member at its bottom made of an abrasion-resisting resilient material.

* * * * *